United States Patent [19]

Albrecht et al.

[11] Patent Number: 4,569,693

[45] Date of Patent: Feb. 11, 1986

[54] PROCESS FOR IMPROVING THE FLOWABILITY AND INCREASING THE BULK DENSITY OF HIGH-SURFACE AREA VALVE METAL POWDERS

[75] Inventors: Wolf-Wigand Albrecht; Axel Hoppe, both of Bad Harzburg; Uwe Papp, Goslar; Rüdiger Wolf, Vienenburg, all of Fed. Rep. of Germany

[73] Assignee: Hermann C. Starck Berlin, Berlin, Fed. Rep. of Germany

[21] Appl. No.: 525,556

[22] Filed: Aug. 22, 1983

[30] Foreign Application Priority Data

Aug. 30, 1982 [DE] Fed. Rep. of Germany ....... 3232245

[51] Int. Cl.$^4$ ................................................ B22F 3/00
[52] U.S. Cl. ........................................ 75/252; 29/570; 419/19; 419/37; 75/255
[58] Field of Search ............... 75/252, 0.5 BB, 0.5 R, 75/251, 255; 420/427, 425, 426; 29/570; 419/19, 30, 36, 37

[56] References Cited

U.S. PATENT DOCUMENTS

| | | | |
|---|---|---|---|
| 3,141,235 | 7/1964 | Lenz | 75/252 |
| 3,867,129 | 2/1975 | Ronneau et al. | 75/0.5 BB |
| 4,009,007 | 2/1977 | Fry | 75/252 |
| 4,041,359 | 8/1977 | Mizushima et al. | 361/433 |
| 4,106,932 | 8/1978 | Blachford | 75/252 |
| 4,154,609 | 5/1979 | Hahn | 75/252 |

*Primary Examiner*—Christopher W. Brody
*Attorney, Agent, or Firm*—Ladas & Parry

[57] ABSTRACT

The invention relates to an improvement of the flowability and an increase in the bulk density of high-surface area valve metal powders by means of the addition of finely divided extraneous metal oxides in quantities of up to 5000 ppm, relative to the quantity of metal, before the powder-metallurgical processing of the valve metal powder.

18 Claims, No Drawings

PROCESS FOR IMPROVING THE FLOWABILITY AND INCREASING THE BULK DENSITY OF HIGH-SURFACE AREA VALVE METAL POWDERS

DESCRIPTION

The invention described below relates to an improvement of the flow properties and, in line with this, an increase in the bulk density of high-surface area valve metal powders, whereby the powder-metallurgical processing of the valve metal powders is considerably facilitated.

The further development and the improvement in the quality of, for example, high-surface area tantalum metal powders for the manufacture of tantalum electrolyte capacitors is characterized by the general trend towards increasingly larger specific surface areas of such metal powders, whereby in the end the specific electric charge of electrolyte capacitors manufactured therefrom is increased. The enlargement of the specific surface areas of metal powders can be obtained in two different ways:
1. by reducing the particle sizes and
2. by forming irregular particle shapes, the desired shape being, for example, that of platelets.

Both these measures have the undesired side-effect of a noticeable deterioration in the mechanical properties of such metal powders with respect to the possible powder-metallurgical processing methods. The poor flow properties of the powders, together with the low bulk density, lead to non-uniform filling of the matrix during the manufacture of anodes, in particular if compacts of small dimensions and low weights are formed. Even though the addition of flow aids and agglomeration aids, such as organic binders, for example camphor, stearic acid or polyethylene glycol, has been accepted in practice for a long time and has shown certain advantageous effects, a satisfactory improvement of the flow properties cannot really be achieved in the lastmentioned manner.

In U S. Pat. No. 4,041,359, a report was given on the effect of compacting aids, amongst which oxides of the type used according to the invention were also mentioned. In that publication, however, the use of lubricants and compacting aids is envisaged only for the case where the extraneous additions are either completely removed before or during sintering, or sintering is omitted or a heat treatment is carried out only up to a permissible limit, at which a chemical reaction between the additives and the valve metal cannot take place.

Moreover, U.S. Pat. No. 4,154,609, issued May 15, 1979 to Hähn, discloses a process for the manufacture of valve metal sintered anodes, wherein special inorganic lubricants, which are characterized as sulfides, selenides and tellurides of the Vth and VIth subgroups of the periodic system, as well as boron nitride and silicon nitride, are added to the valve metal powder before the compacting step, in order to improve the porosity. These lubricants serve to extend the lives of the compacting dies and additionally permit a reduction of the compacting densities, which is accompanied by a reduction in the porosity of the sintered bodies. After sintering, 2 to 70% by weight of the introduced lubricants remain in the sintered anodes which, depending on the selection of the particular lubricant, have improved electrical properties. There is, however, no evidence in the last-mentioned U.S. patent to the effect that the measures according to the state of the art have a positive influence on the flow properties and the bulk densities of the valve metal powder.

Although the use of extraneous metal oxides, in particular of amorphous pyrogenic silica, as an aid for improving the flow properties of poorly flowing powders and dusts is generally known, an addition of these aids to a tantalum metal powder for electrolyte capacitors, which as a rule has to meet stringent purity requirements, is really a forbidden measure, which was excluded from consideration because the introduced extraneous substances can only partially vaporize out of the sintered body when the compacts are sintered, whilst an organic binder usually vaporizes or decomposes completely on sintering.

On the one hand, a detrimental increase in the oxygen content of the sintered anodes was therefore to be expected, which, as experience shows, leads to embrittlement and hence to the risk of breakage of the sintered-in supply wire, and, on the other hand, it was also to be feared that a point-wise contamination of the pure tantalum metal with extraneous metals, tantalum alloys being formed, would cause an adverse influence on the electrical properties. Regarding the latter aspect, the published Japanese Patent Application No. 19,704/1979 by Messrs. Showa K.B.I. Co. may be mentioned, where this disadvantage is extensively discussed. According to this publication, it is a disadvantage if silica is added to the finished tantalum metal, instead of adding it to the starting materials *before* preparation of the metal.

According to the invention, however, it was found surprisingly that, inspite of the prejudices from the state of the art, the flow properties of very fine powders of valve metals, and at the same time their bulk density, can be improved in an advantageous manner by admixing very finely divided extraneous metal oxides, without an adverse influence on the electrical properties of valve metal anodes manufactured from these powders, these properties rather being noticeably improved.

Examples of finely divided extraneous metal oxides, suitable for the purpose according to the invention include amorphous pyrogenic silica ($SiO_2$), amorphous alumina, titanium dioxide, talc (Mg silicate) or magnesium oxide, as well as combinations of the said oxides.

Preferably, these extraneous metal oxides are added in a quantity of 300 to 2000 ppm (relative to the quantity of metal).

DESCRIPTION OF THE PROCESS

Fine valve metal powder of the type of high-surface area capacitor quality, for example grade PL 18,000 from the applicant's production, is thoroughly mixed in a suitable mixer with an addition of very finely divided extraneous metal oxides in quantities of up to 5000 ppm, relative to the quantity of metal, in order to obtain as homogeneous as possible a distribution of the flow aid. The free-flowing valve metal powder treated according to the invention is then further processed in a known manner by compacting and sintering, to give sintered anodes.

The valve metals which can be used are in particular tantalum and its alloys as well as other metals of groups IVb, Vb and VIb of the periodic system, and alloys thereof (see also "Oxides and Oxide Films", Volume 1, edited by John W. Diggle, Pages 94 and 95, 1972, Marcel Dekker, Inc., N.Y.).

The valve metal powders improved in accordance with the invention are employed in a known manner: for this purpose, the valve metal powders are processed by compacting cylindrical blanks and subsequent sintering at an elevated temperature under an inert gas or in a high vacuum to give valve metal anodes for electrolyte capacitors. Compacting is carried out by filling a matrix with free-flowing metal powder and compacting the quantity of powder by means of a ram which, at the same time, introduces a suitable connecting wire of the same valve metal via a central orifice into the raw compact. The "green" compacts which are still fairly sensitive mechanically, are then consolidated by sintering at temperatures below the melting point of the valve metal under an inert gas or in a high vacuum, to give stable porous valve anodes.

EXAMPLE 1

Very fine high-surface area tantalum metal powder, grade PL 18,000 from the applicant, is thoroughly mixed in an intensive mixer with amorphous pyrogenic silica ($SiO_2$) in quantities of 1000 ppm (0.1%), relative to the quantity of metal, the most homogeneous possible distribution of the flow aid being obtained. The mechanical properties, improved in accordance with the invention, are tested by known measurement methods, specifically for flow properties with the aid of the Hall Flow Meter, and the SCOTT bulk-density measuring apparatus (according to ASTM B 329-76).

Subsequently, the tantalum powder treated according to the invention is processed, likewise in a known manner, to give sintered anodes which, for determining the electrical properties, were anodically oxidized in the conventional manner in a phosphoric acid bath, the formation voltage being 70 volt, and were then measured electrically, the measured values of interest being in particular the specific charge (mC/g), the relative residual current ($\mu A/nC$) and the breakdown voltage of the anode.

The results measured on the samples mentioned here and in the examples which follow are summarized in the Table below.

EXAMPLE 2

The combination of the finely divided extraneous metal oxides $SiO_2$, $Al_2O_3$ and $TiO_2$ was used in this example, the procedure being analogous to Example 1.

EXAMPLES 3 and 4

In two further examples 3 and 4, the procedure of Example 1 was followed, dual combinations of $SiO_2$–$TiO_2$ and $SiO_2$–$Al_2O_3$ being used this time. The results of these experiments are also summarized in the Table.

EXAMPLE 5

In order to test the advantages of the invention also for a different valve metal, 1000 ppm of amorphous pyrogenic silica were added to a corresponding fine niobium metal powder. Markedly improved flow properties and a higher bulk density were also obtained with this niobium metal powder, in an analogous manner.

COMPARISON EXAMPLE ("CE" in the Table)

A tantalum metal powder of the type used above was processed, without the addition of any extraneous metal oxides, to give sintered anodes and subjected to the same testing and measuring method, in order to underline the advantage, according to the invention, of using the extraneous metal oxides. The results of this comparison experiment are given at the beginning of the Table below.

As can be seen from the measured results, the flow properties and bulk density of the Ta powders very clearly change with the additions of extraneous metal oxides, according to the invention, in favour of improved mechanical processability. The electrical data of the sintered anodes manufactured from these powders show an increase in the specific charge and improved residual current behavior in the case of the higher-surface area Ta powder; however, the increased dielectric strength (breakdown voltage) is particularly clear in the examples with the tantalum powder. It is found here that the species of extraneous metal oxide, mentioned in the examples, individually and together give approximately the same effects in mixtures, with respect to both the mechanical and electrical properties.

TABLE

Properties of Tantalum Metal Powder (capacitor quality) with additions of finely divided extraneous metal oxides

| Example | Addition ppm | Type | Flow properties[1] (seconds/50 g) | Bulk density[2] (g/inch$^3$) | Specific charge mC/g | Leakage current $\mu A/nC$ | Breakdown voltage |
|---|---|---|---|---|---|---|---|
| CE | — | none | 58 | 18.2 | 18.15 | 0.20 | 120 |
| 1 | 1000 | $SiO_2$ | 28 | 23.6 | 18.46 | 0.18 | 150 |
| 2 | 900 / 600 / 300 | $SiO_2$ / $Al_2O_3$ / $TiO_2$ | 24 | 24.1 | 18.25 | 0.22 | 164 |
| 3 | 900 / 300 | $SiO_2$ / $TiO_2$ | 27 | 24.1 | 18.37 | 0.20 | 149 |
| 4 | 900 / 600 | $SiO_2$ / $Al_2O_3$ | 25 | 24.1 | 18.19 | 0.19 | 140 |

[1]Instructions for measuring the flow properties by means of the Hall Flow Meter: Sample Weight: 50 g; Funnel opening: 0.2 inch (0.5 mm)
[2]Bulk density determination of the free-flowing powder, according to ASTM B 329-76

We claim:

1. Process for improving the flowability and increasing the bulk density of a high-surface area valve metal powder of capacitor quality suitable for being subjected to powder-metallurgical processing by compacting and sintering to produce a sintered anode, which comprises admixing with said valve metal power an additive for increasing the flow properties and bulk density of the valve metal powder, said additive consisting essentially of finely divided extraneous metal oxide in a quantity of up to 5000 ppm (relative to the quantity of metal) before the powder-metallurgical processing of the valve metal powder, said extraneous metal oxide being amorphous pyrogenic silica, aluminum oxide, talc powder, magnesium oxide or a combination thereof, or the combination of titanium dioxide and one or more of said other extraneous metal oxides.

2. Process according to claim 1, wherein niobium or tantalum is used as the valve metal.

3. Process according to claim 1, wherein amorphous pyrogenic silica is used as the extraneous metal oxide.

4. Process according to claim 1, wherein finely divided aluminum oxide is used as the extraneous metal oxide.

5. Process according to claim 1, wherein talc powder is used as the extraneous metal oxide.

6. Process according to claim 1, wherein magnesium oxide is used as the extraneous metal oxide.

7. Process according to claim 1, wherein the extraneous metal oxide is added in a quantity of 300 to 2000 ppm (relative to the quantity of metal).

8. Process according to claim 2, wherein the extraneous metal oxide is added in a quantity of 300 to 2000 ppm (relative to the quantity of metal).

9. Valve metal powder of capacitor quality suitable for being subjected to powder-metallurgical processing by compacting and sintering to produce a sintered anode, said powder having been admixed with an additive by the process according to claim 1.

10. Process for preparing a sintered anode which comprises compressing and sintering a high-surface area valve metal powder of capacitor quality, wherein said valve metal powder subjected to said compressing and sintering is admixed with an additive for increasing the flow properties and bulk density of the valve metal powder, said additive consisting essentially of finely divided extraneous metal oxide present in a quantity of up to 5000 ppm (relative to the quantity of metal), said extraneous metal oxide being amorphous pyrogenic silica, aluminum oxide, talc powder, magnesium oxide or a combination thereof, or a combination of titanium dioxide with one or more of said other extraneous metal oxides.

11. Process according to claim 10, wherein tantalum is used as the valve metal.

12. Process according to claim 10, wherein the extraneous metal oxide is present in a quantity of 300 to 2000 ppm (relative to the quantity of metal) in said admixture.

13. Process according to claim 11, wherein the extraneous metal oxide is present in a quantity of 300 to 2000 ppm (relative to the quantity of metal) in said admixture.

14. A sintered anode made by the process according to claim 10.

15. Valve metal powder according to claim 9, wherein the extraneous metal oxide is amorphous pyrogenic silica, aluminum oxide, or the combination thereof.

16. A sintered anode according to claim 14, wherein the extraneous metal oxide is amorphous pyrogenic silica, aluminum oxide, or the combination thereof.

17. Valve metal powder according to claim 15, in which titanium dioxide is used in addition to one or more of the other extraneous metal oxides.

18. A sintered anode according to claim 16, in which titanium dioxide is used in addition to one or more of the other extraneous metal oxides.

* * * * *